July 12, 1932. S. I. PRESCOTT ET AL 1,867,095

WHEEL

Original Filed Dec. 12, 1919    2 Sheets-Sheet 1

Sydney I. Prescott
Francis J. Rummler   Inventors
By their Attorney
Sydney I. Prescott July 12, 1932.   S. I. PRESCOTT ET AL   1,867,095
WHEEL
Original Filed Dec. 12, 1919   2 Sheets-Sheet 2
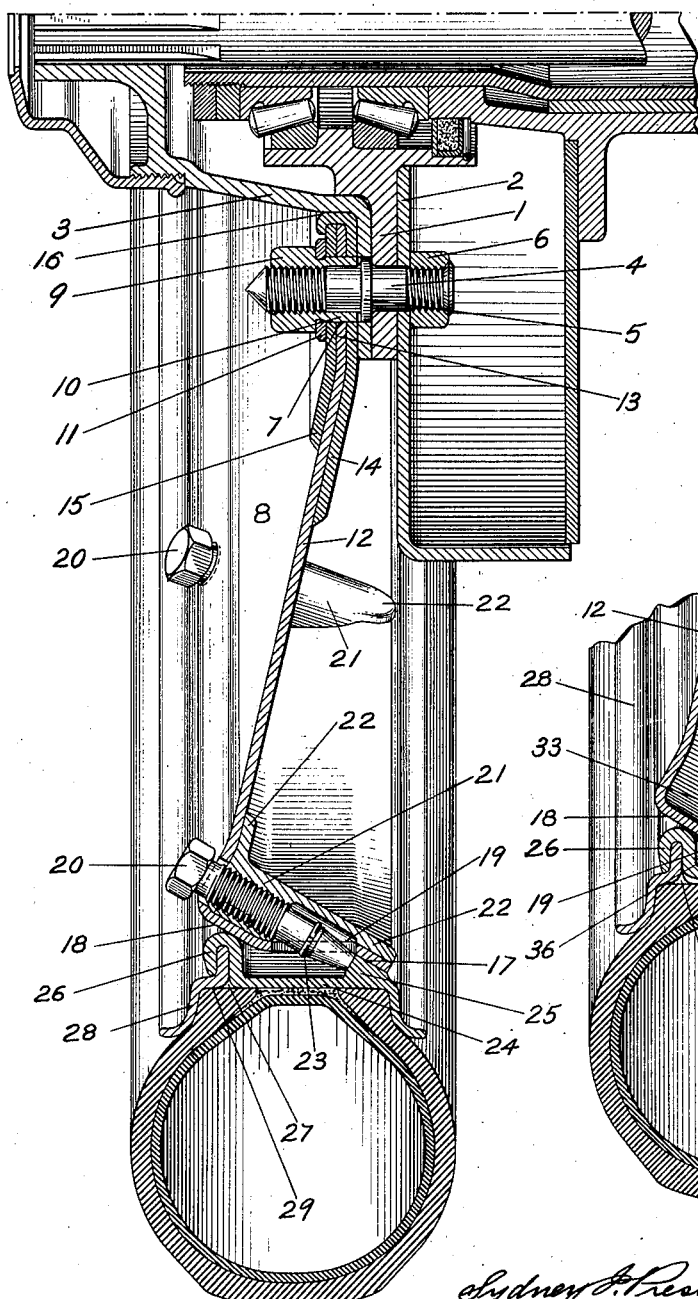
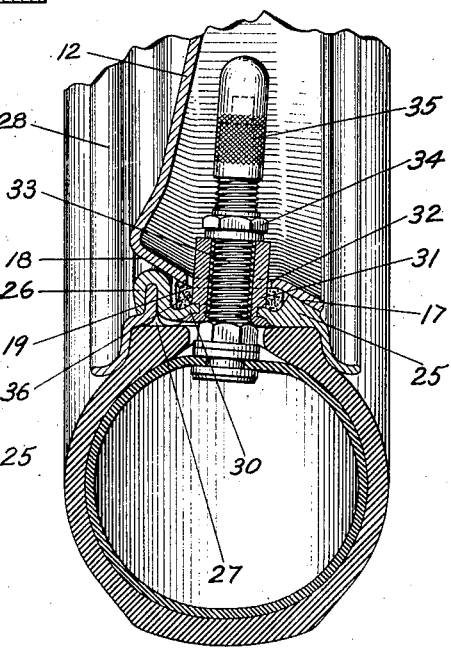

Patented July 12, 1932

1,867,095

UNITED STATES PATENT OFFICE

SYDNEY I. PRESCOTT, OF NEW YORK, N. Y., AND FRANCIS J. RUMMLER, OF LYNDHURST, NEW JERSEY

WHEEL

Application filed December 12, 1919, Serial No. 344,282. Renewed July 11, 1931.

This invention relates to an improvement in wheels, particularly those of the type used on motor cars, and its main object is the production of a wheel possessing numerous advantages long sought but heretofore found unattainable. With this and other objects not specifically mentioned in view, the invention consists in certain constructions and combinations which will be hereinafter fully described and then specifically set forth in the claims hereunto appended.

Figure 1:
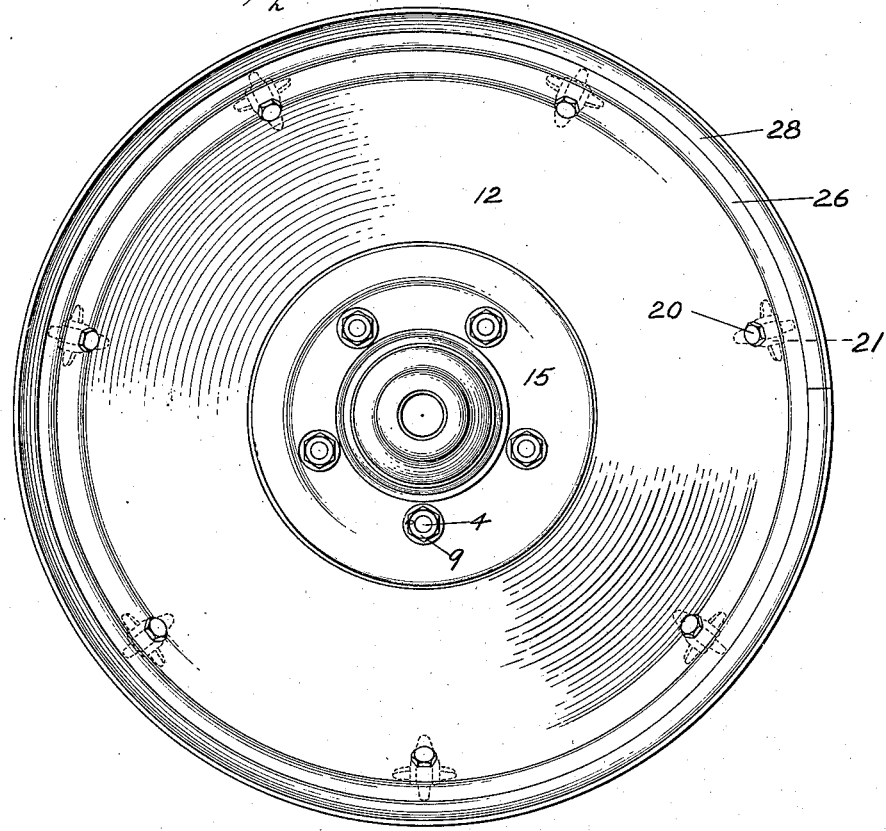
Figure 2:
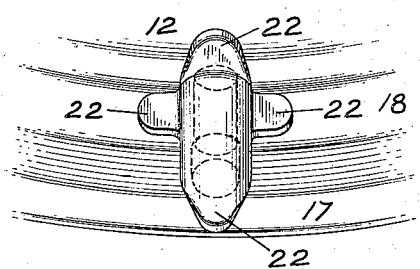
Figure 3:
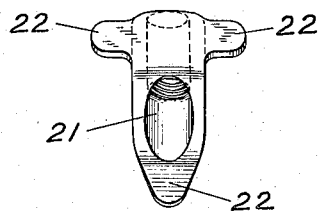

In the accompanying drawings, which form a part of this specification and in which like characters of reference indicate the same or like parts, Fig. 1 is a side elevation of a wheel constructed in accordance with the invention; Figs. 2 and 3 are detail views illustrating a rim holding nut used on the wheel shown in Fig. 1, and serving also to reinforce the rim supporting seat and to act as a vibration damper; Fig. 4 is a cross-sectional elevation, on a larger scale, of a part of the wheel shown in Fig. 1 taken through one of the rim holding devices; and Fig. 5 is a fragmentary cross-sectional view taken through the rim driving and valve enclosing structure.

In carrying the invention into effect, there is provided a body having a rim supporting seat, and a series of thrust screws working obliquely across said body and adapted to engage and hold a demountable rim on said seat. In the best constructions, there is also provided means for retaining the screws in the body when in rim releasing position, a series of vibration dampers carried by the body, devices for holding the body on its hub which are held tight by the driving torque, means for reinforcing the rim seat where the greatest strain occurs, a rim supported on the seat and provided with a channel in the plane of wheel rotation, a tire flange engaging said channel and adapted to underlie a tire bead, devices carried by the rim whereby the rim may be mounted and demounted without disturbing the tire valve stem and its nut and cap, and a hollow rim driving member locating and enclosing the valve stem and forming a seat for its nut and cap. All of the above mentioned means, devices and parts may be widely varied in construction within the scope of the claims. The particular device selected to illustrate the invention is but one of many possible concrete embodiments of the same, and the invention therefore is not to be restricted to the precise details of the structure shown and described.

Referring to the drawings, 1 indicates the hub flange, 2 the brake drum, and 3 the driving flange of a full-floating axle well known in the art and therefore needing no detailed description herein. Snugly fitting suitable holes in the flange 1 and brake drum 2 are a number of body holding bolts 4 each provided with a flange 5 engaging the outer side of the hub flange 1. These bolts are forced into place in the hub flange and brake drum and held therein by means of nuts 6, and after these nuts are screwed tight on the bolts, the bolt ends are peened over them, thus preventing them from working loose, and holding the bolts immovable in the hub flange. The bolts 4 project outwardly through bolt holes 7 arranged about the centre of a wheel body generally indicated by the reference character 8, but are smaller than said bolt holes. Threaded on the projecting ends of the bolts are nuts 9 each having a skirt 10 bridging the space between the bolt and the wall of its bolt hole. Each nut carries with it a loose washer 11 sprung into position thereon in a well known manner. The particular function of this washer is to engage the side of the body during the last turn of the nut and remain stationary while the nut is forced tight, thus preventing marring of the finished surface of the body. The drive of the wheel is through the driving flange 3, the bolts 4, and the nut skirts 10. The driving torque thus holds the nut skirts as in a vise and prevents the nuts from working loose, and since the co-efficient of expansion of all of the parts here bolted together is the same, no condition can arise after the nuts are initially tightened to result in loosening them and causing the wheel to creak; yet when the driving torque is off as in the event of changing wheels, the nuts are easily removed and the wheel demounted.

The body 8 is provided with an inwardly extending conical web 12 having a flat vertex 13 and is reinforced by an annular plate 14 between the driving flange and the web. A second reinforcing annular plate 15 lies against the outer side of the web. The plate 14 is swaged at 16 over the inner peripheries of the web and outer plate; and both plates are welded to the web at their outer peripheries. It is to be understood that the hub flange of a front or steering wheel is so located that the wheel bodies may be interchangeably used on both axles.

The body 8 is further provided with a rim supporting seat having a conic step 17 inside of the median plane of the wheel, and a conic step 18 of smaller diameter outside of said plane, with a cylindrical section 19 connecting said steps. The angle of the steps is large enough to prevent a rim from being forced over and off the same, and further to facilitate mounting and demounting the rim.

For the purpose of holding a demountable rim on said seat, there is provided a number of thrust screws 20 working obliquely across the body, parallel with and between the faces of said steps, in nuts 21 each having a number of projecting lugs 22 spot-welded or riveted to the body, thus reinforcing the seat where rim holding strains occur. Either or both the screws and nuts may be made of steel high in nickel, tobin bronze, or other material of sufficient strength, to prevent them from rusting fast by reason of neglect. Each screw 20 has an extra long thrust resisting thread to hold it securely in adjusted position and to lengthen its life. Each screw is further provided with a spring ring 23 engaging in a well known manner a circumferential groove in the screw, the particular function of this ring being to engage the thread of the nut and stop the screw when it has been backed out far enough to release a rim, thus retaining the screw in the body when in rim releasing position. It is unnecessary to back all of the screws even part way out when releasing a rim, for the rim may be easily demounted after the screws on the side of the wheel opposite the valve stem have been backed clear of said rim, the others remaining in place. The rim engaging ends of the screws, as well as the steps, are broad and angular enough to prevent a rim from being forced over them under any strain that will not wreck the car on which they are in use. Moreover, there can be no loosening of the rim-holding devices after initial tightening because the parts thereof operate under compression and are capable of successfully resisting any strain to which they may be subjected. A material saving in time and labor is thus effected by the structure just described, when mounting or demounting a rim, and there are no loose parts to be damaged or lost, and nothing to mar the finished surface of the wheel body.

Mounted on the steps 17 and 18 is an especially co-ordinated continuous demountable rim 24 having two inner peripheral ribs 25 and 26, the former being triangular in cross section and the latter having a channel 27 in the plane of wheel rotation. This rim forms the subject matter of our application for Letters Patent filed of even date herewith, Serial Number 344,283. The rib 25 rests on the step 17 throughout its circumference, and carries its share of the load. The rim holding screws 20 bear against its side. The rib 26 rests on the step 18 throughout its circumference, thus carrying its share of the load; and it performs the further function of supporting a split tire flange 28 engaging the channel 27 and adapted to underlie a tire bead at 29. A tire bead cannot stretch far enough to accidentally release the tire flange from its engagement with the channel 27, even when the tire is deflated. So long as the tire bead is not destroyed, the tire cannot work, blow, or be thrown off the rim. Thus, the tire itself serves to lock the tire flange securely in position. Yet, when it is desired to demount the tire, without demounting the wheel as a whole, or the rim from the body, it is only necessary to deflate the tire and push it inward where the split in the tire flange is, pry one end of said flange out of the channel 27, then peel the flange off, the flange itself pushing the tire back progressively as it progressively comes out of the channel. A reverse operation confines the tire on the rim and locks the tire flange and the tire in operative position. It will now be readily understood that with this wheel there are always available three ways of changing a tire; that is to say, the wheel as a whole, the rim carrying a tire, or the tire alone, may be changed with less labor and in less time than possible heretofore, and with greater safety. The demountable, continuous, quick-detachable tire rim shown is preferred because it contributes to the general strength of the wheel as a whole a certain strength of its own which split rims do not possess; but other types of rims, either continous or split, may be used on the same body; and different sizes of rims also may be used thereon.

Heretofore, passenger motor cars have been equipped with one of three distinct types of wheels, one type having non-demountable bodies and non-demountable rims, another having non-demountable bodies and demountable rims, and the other having demountable bodies and non-demountable rims. Some car users prefer one type, some another. To meet the demands of the trade it has therefore been necessary to manufacture several sizes of each type, and this necessitated the manufacture of as many sizes of tires, with numerous oversizes. The cars of each maker are supplied with wheels of one of the above mentioned types as standard equipment.

Insofar as the wheels are concerned, each car satisfies only one of the three classes of users. To satisfy the other classes the wheels must be changed. To change the type of wheels on a built car involves not only the cost of the new wheels but the cost of refitting their hubs. This is an expensive proceeding which takes time and is usually a source of considerable annoyance, but it has been unavoidable. When a car builder or dealer cannot or will not change the wheels on a car to satisfy the requirements of a prospect, he not infrequently loses a sale and a customer. The present wheel obviates all of these difficulties by including in a practical single wheel organization the heretofore distinguishing features of all three types, the wheel being capable of use in either of the three ways without change, loss of time, or additional cost. Three sizes of the present wheel collectively meet the load-carrying requirements of all passenger cars and the type requirements of all classes of users. This standardizing feature of the present invention is capable not only of materially reducing manufacturing and sales cost on wheels, and meeting the type requirements of all car users, but also of reducing manufacturing cost to tire makers and stock-carrying cost to tire dealers, for the three wheels require but three sizes of tires although each wheel will carry an oversize tire without any change whatever. The present wheel is in a broad sense a practical wheel of a new type, which, since it is capable of use without change on all passenger cars and in either of the three ways desired, may be termed a universal type.

The rim 24 is depressed and apertured at 30. Swaged or welded into the rim at this point is a rim driving sleeve 31 which projects through a rim driving aperture 32 in the cylindrical section 19 of the body. This sleeve further serves to enclose a tire valve stem 33 of standard construction and to form a seat at its inner end for a standard stem nut 34 and cap 35. The sleeve is large to provide a large driving surface and to permit the whole valve structure to go into place, or come out of place, intact, when mounting or demounting a rim, and to fully protect said structure from water, dust or mud whether the rim and tire be on or off the wheel. To close the aperture 32 and keep water, dust or mud out of the space between the body and rim, the sleeve 31 carries a washer 36 impregnated with oil. In view of the fact that heretofore it has been necessary to remove a valve nut and cap from the stem before a rim could be demounted, and to replace them after the rim has been remounted, it will be readily understood that the structure just described effects a further saving in time and labor when mounting or demounting a rim. A less desirable but nevertheless effective structure would include a rim driving member separate from a valve structure capable of being mounted or demounted intact.

It is well known in physics that a vibrating circular plate or disc naturally develops nodal lines dividing the surface by diametrical lines into four, or a greater, but always even, number of sectors, an odd number being incompatible with the general law of stationary waves that the parts of a body adjoining a nodal line on either side must always vibrate oppositely to each other, and that the position of nodal lines may be determined by touching the points at which it is desired to produce them. In a vehicle wheel, objectionable major vibrations naturally start where force is applied to the wheel on the road; that is to say, at the rim. For this reason, vibration dampers are permanently secured to the body 8 at its periphery, the function of these dampers being to prevent development of natural nodal lines by stiffening the body web at an odd number of points, thus establishing an odd number of nodal lines. As hereinbefore pointed out, the rim holding devices perform the second function of reinforcing and stiffening the periphery and web of the body where they are located, thus interfering with free vibration of said body. Since an odd number of vibration dampers is incompatible with vibration wave propagation, and the rim holding devices are located at the source of vibration they may be made to perform the third function of damping vibration, and an odd number of rim holding devices is therefore employed, seven for example. To damp any possible internal minor vibrations originating in the power plant and transmitted to the wheel body through its hub, an odd number of body holding bolts is employed, five for example.

The structure hereinbefore described thus possesses the following exclusive advantages: The body holding bolts are held tight by the driving torque; the wheel has dampers at the source of vibration; the tire, the rim, and the wheel, are independently demountable; either continuous or split rims may be used without body changes; different sizes of rims can be used on the same body; the tire is locked on the rim by the tire itself; the tire cannot work, blow, or be thrown off the rim; the demountable rim cannot be thrown off the wheel; the demountable rim and holding devices cannot rust fast; the rim holding screws remain in the body when changing rims; no loose parts are used for rim holding purposes; the valve stem nut and cap are not disturbed when changing rims; the valve is fully protected from water, dust and mud whether on or off the wheel; the rim drive and valve housing is a unitary structure; there is nothing to mar the finish of the body when changing rims or wheels or removing tires; the various parts of the structure operate under compression; and changing rims involves less time and labor.

What is claimed is:

1. In a wheel of the type described, the combination with a hub, of a body mounted on said hub, a tire rim mounted on said body, and means for damping vibration in said body including devices for holding said body on said hub and devices for holding said rim on said body.

2. In a wheel of the type described, the combination with a pressed metal body, of an odd number of vibration dampers permanently united with said body at its periphery and thus adjacent the source of major vibrations.

3. In a wheel of the type described, the combination with a pressed metal body, of an odd number of vibration dampers permanently united with said body at its periphery and thus adjacent the source of major vibrations, and a number of vibration dampers acting on said body adjacent its centre and the source of minor vibrations.

4. In a wheel of the type described, the combination with a hub, of a body mounted on said hub, a tire rim removably mounted on said body, an odd number of long-threaded nut members obliquely arranged and permanently united with said body and acting to reinforce said body where rim holding strains occur and also acting as vibration dampers, and a corresponding number of thrust screws working in said nut members and engaging said rim.

5. In a wheel of the type described, the combination with a hub provided with a flange, of a body mounted on said hub and resting against said flanges and provided with an odd number of bolt holes arranged about its centre, a tire rim mounted on said body, a corresponding number of bolts immovably secured to said flange and projecting through but smaller than said holes, and a corresponding number of nuts provided with skirts bridging the space between said bolts and the walls of said bolt holes said nuts acting to hold said body against said flange and also acting as vibration dampers.

6. The combination with a wheel body, of a hub, means for fastening said body to said hub, and means including said fastening means for establishing an odd number of nodal lines in said body to damp vibration set up therein.

7. The combination with a wheel body, of a rim, means for fastening said rim to said body, and means including said fastening means for establishing in said body an odd number of nodal lines to damp vibration set up therein.

8. The combination with a wheel hub, of a body, means for fastening said body to said hub, a rim, means for fastening said rim to said body, and means including both of said fastening means for establishing in said body an odd number of nodal lines to damp vibration set up therein.

9. A wheel body having means for establishing therein an odd number of nodal lines to damp vibration set up therein.

10. Fastening means for a wheel body and its hub, comprising a flange on the hub, stud holes in the body, studs smaller than said holes and rigidly secured to said flange and projecting through said holes, and nuts on said studs engaging said body and substantially filling said holes and forming the sole body supporting connection between said studs and the walls of said holes.

11. Fastening means for a wheel body and its hub, comprising a flange on the hub, cylindrical stud holes in the body, studs smaller than said holes and rigidly secured to said flange and projecting through said holes, and nuts on said studs engaging said body and having cylindrical skirts substantially filling said holes and forming the sole body supporting connection between said studs and the walls of said holes.

12. A standardizing wheel of the type described, comprising a hub, a roadside-demountable body having a central aperture permitting free movement by hand of said body in and out of position over said hub, body fastening means a part of which is immovable with respect to said hub for positioning and supporting and a part of which is movable with respect thereto for securing said body in position, a roadside-demountable quick-detachable tire rim, and means for fastening said rim to said body, whereby a tire may be removed either alone or with the rim as a unit or with the rim and body as a unit, said body including a steel disc and an annular plate on either side of said disc the inner plate being swaged over the disc and the outer plate at their inner peripheries and both plates being welded to said disc at their outer peripheries.

13. A standardizing wheel of the type described, comprising a hub, a roadside-demountable body having a central aperture permitting free movement by hand of said body in and out of position over said hub, body fastening means a part of which is immovable with respect to said hub for positioning and supporting and a part of which is movable with respect thereto for securing said body in position, a roadside-demountable quick-detachable tire rim, and means for fastening said rim to said body, whereby a tire may be removed either alone or with the rim as a unit or with the rim and body as a unit, said body having means for establishing therein an odd number of nodal lines to damp vibration set up therein in road operation.

14. A standardizing wheel of the type described, comprising a hub, a roadside-demountable body having a central aperture permitting free movement by hand of said body in and out of position over said hub, body fastening means a part of which is immovable with respect to said hub for positioning and supporting and a part of which is movable with respect thereto for securing said body in position, a roadside-demountable quick-detachable tire rim, and means for fastening said rim to said body, whereby a tire may be removed either alone or with the rim as a unit or with the rim and body as a unit, said body having means including said body fastening means and said rim fastening means for establishing in said body an odd number of nodal lines to damp vibration set up in said body in road operation.

In testimony whereof, we have signed our names to this specification.

SYDNEY I. PRESCOTT.
FRANCIS J. RUMMLER.